(12) United States Patent
Hong et al.

(10) Patent No.: US 12,090,566 B2
(45) Date of Patent: Sep. 17, 2024

(54) ELECTRICALLY ASSISTED PRESSURE JOINING APPARATUS AND ELECTRICALLY ASSISTED PRESSURE JOINING METHOD

(71) Applicants: UNIVERSITY OF ULSAN FOUNDATION FOR INDUSTRY COOPERATION, Ulsan (KR); SEOUL NATIONAL UNIVERSITY R&DB FOUNDATION, Seoul (KR)

(72) Inventors: Sung-Tae Hong, Seoul (KR); Doo-Man Chun, Busan (KR); Hong-Seok Park, Ulsan (KR); Heung Nam Han, Seoul (KR); Ju Won Park, Seoul (KR); Yongfang Li, Ulsan (KR); Dinh Son Nguyen, Ulsan (KR)

(73) Assignees: UNIVERSITY OF ULSAN FOUNDATION FOR INDUSTRY COOPERATION, Ulsan (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 700 days.

(21) Appl. No.: 17/293,038

(22) PCT Filed: Nov. 14, 2018

(86) PCT No.: PCT/KR2018/013932
§ 371 (c)(1),
(2) Date: May 12, 2021

(87) PCT Pub. No.: WO2020/101065
PCT Pub. Date: May 22, 2020

(65) Prior Publication Data
US 2021/0394298 A1 Dec. 23, 2021

(51) Int. Cl.
*B23K 11/30* (2006.01)
*B33Y 10/00* (2015.01)
*B33Y 80/00* (2015.01)

(52) U.S. Cl.
CPC ............ *B23K 11/30* (2013.01); *B33Y 10/00* (2014.12); *B33Y 80/00* (2014.12)

(58) Field of Classification Search
CPC .......... B23K 11/30; B33Y 10/00; B33Y 80/00
See application file for complete search history.

(56) References Cited

U.S. PATENT DOCUMENTS

2015/0197061 A1    7/2015   Wang et al.
2018/0326524 A1*  11/2018   Nicholas ............. B23K 1/0016
2019/0366473 A1*  12/2019   Dong .................. B23K 20/125

FOREIGN PATENT DOCUMENTS

JP    07-124760 A    5/1995
JP    07-299570 A   11/1995
(Continued)

OTHER PUBLICATIONS

International Search Report for PCT/KR2018/013932 mailed Aug. 7, 2019 from Korean Intellectual Property Office.

*Primary Examiner* — Janie M Loeppke
*Assistant Examiner* — Theodore J Evangelista
(74) *Attorney, Agent, or Firm* — Revolution IP, PLLC

(57) ABSTRACT

An electrically assisted pressure joining apparatus and an electrically assisted pressure joining method join a first metal member and a second metal member together, and includes an electrode portion, an intermediate portion including a plurality of micropores and inserted between a first metal member and a second metal member, and a pressure portion connected to the electrode portion to receive a current from the electrode portion and transfer the current to the first metal member and the second metal member to apply a pressure to the first metal member such (Continued)

that the first metal member and the second metal member are joined together by the intermediate portion.

9 Claims, 7 Drawing Sheets

(56) References Cited

FOREIGN PATENT DOCUMENTS

| | | | |
|---|---|---|---|
| JP | 2003260585 A | * | 9/2003 |
| KR | 10-2014-0089640 A | | 7/2014 |
| KR | 10-2015-0075434 A | | 7/2015 |
| KR | 10-1921053 B1 | | 11/2018 |

* cited by examiner

ELECTRICALLY ASSISTED PRESSURE JOINING APPARATUS AND ELECTRICALLY ASSISTED PRESSURE JOINING METHOD

TECHNICAL FIELD

The present invention relates to an electrically assisted pressure joining apparatus and an electrically assisted pressure joining method, and particularly, to an electrically assisted pressure joining apparatus and an electrically assisted pressure joining method that join a first metal member and a second metal material by diffusion and joining by applying a current and a pressure to the first metal member and the second metal material.

BACKGROUND ART

In general, electrically assisted pressure joining refers to a method of joining two metal materials to each other by making the two metal materials close contact with each other and applying pressure to and heating the two metal materials. More specifically, in the electrically assisted pressure joining, in a state in which the two metal materials are in contact with each other, a current is applied to the two metal materials, pressure is applied to the two metal materials so as not to cause plastic deformation, and thereby, atoms are diffused in joining surfaces of the two metal materials, resulting in joining of the two metal materials.

An electrically assisted pressure joining apparatus of the related art is disclosed in Korean Patent publication No. 10-2014-0089640.

However, in the electrically assisted pressure joining apparatus of the related art, a first metal material and a second metal material are joined by being pressed in a state of being in contact with each other, that is, surfaces of the first metal material and the second metal material which are in contact with each other are joined to each other. Accordingly, there is a disadvantage in that defects such as barreling may occur in the first metal material and the second metal material due to a high compressive flow stress of the first metal material and the second metal material. In addition, when the first metal material and the second metal material are composed of heterogeneous materials, joining properties may be deteriorated due to a difference in component of a joint portion.

PRIOR ART DOCUMENT

Patent Document

Korean Patent publication No. 10-2014-0089640

SUMMARY OF INVENTION

Technical Problem

An object of an embodiment of the present disclosure is to provide an electrically assisted pressure joining apparatus and an electrically assisted pressure joining method that reduced damage to a first metal material and a second metal material and improve joining properties.

Solution to Problem

According to an embodiment of the present disclosure, an electrically assisted pressure joining apparatus for joining a first metal member and a second metal member together, includes an electrode portion; an intermediate portion including a plurality of micropores and inserted between a first metal member and a second metal member; and a pressure portion connected to the electrode portion to receive a current from the electrode portion and transfer the current to the first metal member and the second metal member to apply a pressure to the first metal member such that the first metal member and the second metal member are joined together by the intermediate portion.

In addition, the pressure portion may include a pressing portion connected to the electrode portion and arranged to be in contact with the first metal member to apply a pressure to the first metal member, and a fixed portion connected to the electrode portion and arranged to be in contact with the second metal member.

In addition, the intermediate portion may be formed in a shape corresponding to a joint portion where the first metal member and the second metal member are in contact with each other.

In addition, the intermediate portion may be manufactured through a three-dimensional printing process.

In addition, the intermediate portion may be printed on the first metal member or the second metal member.

In addition, the intermediate portion may be manufactured by using metal powder.

In addition, the intermediate portion may have one side in contact with the first metal member and the other side in contact with the second metal member and may be formed such that components of the second metal member gradually increase from one side to the other side and components of the first metal member gradually increase from the other side to the one side.

According to another embodiment of the present disclosure, an electrically assisted pressure joining method for joining a first metal member and a second metal member together by using an electrically assisted pressure joining apparatus includes an electrode portion and a pressing portion connected to the electrode portion and arranged to be in contact with the first metal member to apply a pressure to the first metal member and a fixed portion connected to the electrode portion and arranged to in contact with the second metal member, includes an intermediate portion manufacturing step of manufacturing an intermediate portion formed to include a plurality of micropores in a shape corresponding to a joint portion between the first metal member and the second metal member; an intermediate portion arranging step of arranging the intermediate portion between the first metal member and the second metal member; and a joining step of joining the first metal member and the second metal member together through the intermediate portion by receiving a current from the electrode portion and applying a pressure to the first metal member through the pressing portion.

In addition, in the intermediate portion manufacturing step, the intermediate portion may be manufactured through a three-dimensional printing process.

In addition, in the intermediate portion manufacturing step, the intermediate portion may be printed on the first metal member or the second metal member.

In addition, in the intermediate portion manufacturing step, the intermediate portion may be manufactured by using metal powder.

In addition, the intermediate portion may have one side in contact with the first metal member and the other side in contact with the second metal member, and, in the intermediate portion manufacturing step, the intermediate portion may be formed such that components of the second metal member gradually increase from one side to the other side and components of the first metal member gradually increase from the other side to the one side.

Advantageous Effects

According to an electrically assisted pressure joining apparatus and an electrically assisted pressure joining method of the present invention, an intermediate portion may be formed to include a plurality of micropores, and a first metal member and a second metal member may be minimized in damage due to a low compressive flow stress, and a high electrical resistance of the intermediate portion may generate a local high temperature portion, and thus, the first metal member and the second metal member are easily joined together.

In addition, by manufacturing the intermediate portion through three-dimensional printing, the intermediate portion may be easily manufactured and may be printed directly on the first metal member or the second metal member, and thus, a position of the intermediate portion may be easily fixed, and thus, manufacturing efficiency thereof is increased.

In addition, components on one side and the other side of the intermediate portion may be formed to gradually increase components of the first metal member and the second metal member, respectively, and thereby, components of a joint portion between the first metal member and the second metal member may be gradually mixed to increase a joining force.

DETAILED DESCRIPTION OF EMBODIMENTS

Figure 1:
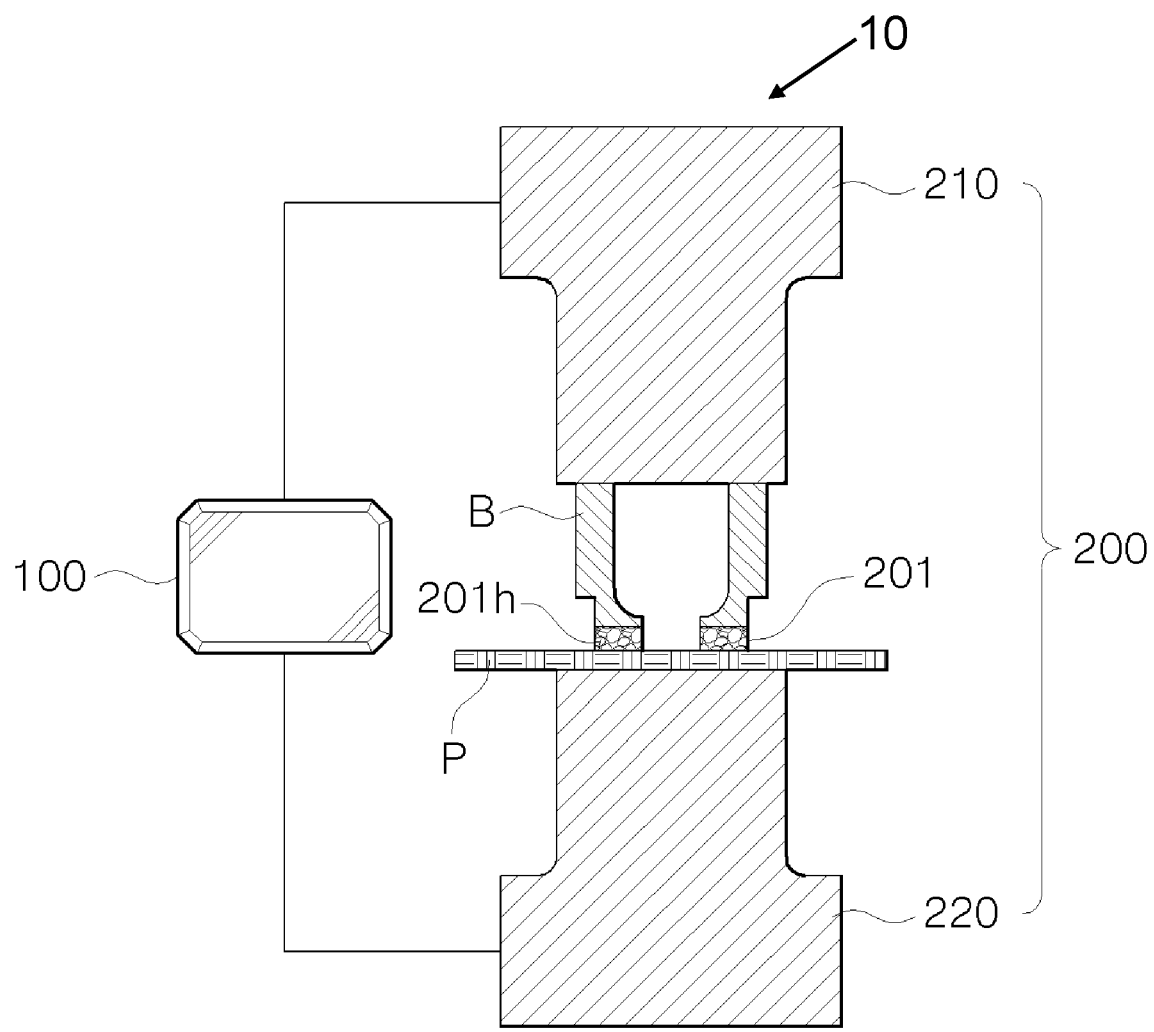
FIG. 1 is a cross-sectional view schematically showing an electrically assisted pressure joining apparatus according to an embodiment of the present invention.
Figure 2:
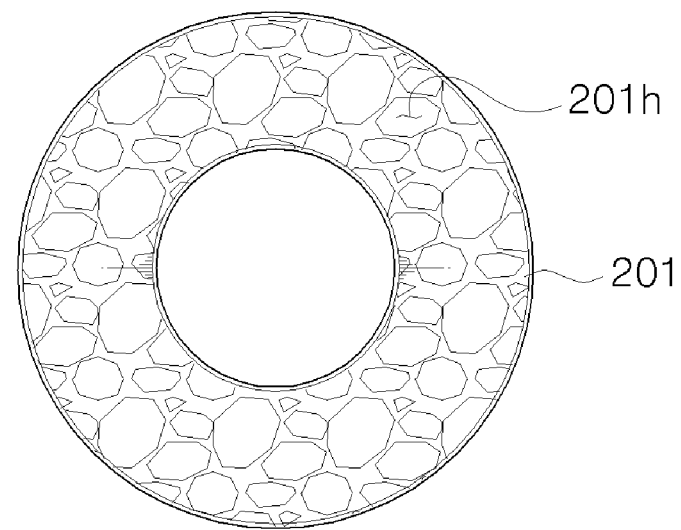
FIG. 2 is a perspective view showing an intermediate portion of the electrically assisted pressure joining apparatus shown in FIG. 1.
Figure 2:
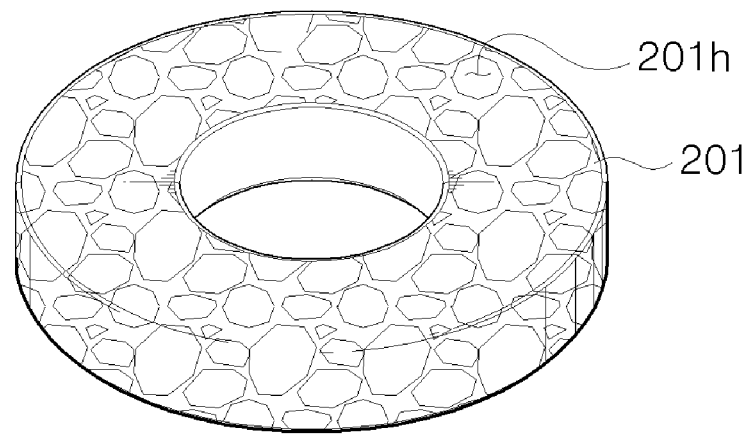

Hereinafter, preferred embodiments of the present invention will be described in detail with reference to the accompanying drawings. At this time, terms or words used in the present specification and claims should not be construed as limited to usual or dictionary meanings and should be interpreted as meaning and concept consistent with the technical idea of the present invention based on a principle that the inventor may properly define concept of the terms in order to describe invention thereof in the best way.

Therefore, the embodiments described in the present specification and the configurations shown in the drawings are only the most preferred embodiments of the present invention and do not represent all the technical ideas of the present invention, and thus, it should be understood that there may be equivalent modification embodiments which may be substituted at the time of the present application.

Hereinafter, embodiments of the present invention will be described in detail with reference to the accompanying drawings.

Referring to FIGS. 1 to 7, an electrically assisted pressure joining apparatus 10 according to an embodiment of the present invention includes an electrode portion 100 and a pressure portion 200 so as to diffuse and join a first metal member B and the second metal member P.

The electrode portion 100 supplies a current to the first metal member B and the second metal member P. That is, the electrode portion 100 is connected to the first metal member B and the second metal member P.

The pressing portion 210 is connected to the first metal member B and the second metal member P to diffuse and join the first metal member B and the second metal member P and is connected to the electrode portion 100. Accordingly, the pressure portion 200 receives a current from the electrode portion 100 and transfers the current to the first metal member B and the second metal member P to cause the first metal member B to be pressed, and thereby, the first metal member B and the second metal member P are joined together. In addition, an intermediate portion 201 is inserted between the first metal member B and the second metal member P. That is, the pressure portion 200 may join the first metal member B and the second metal member P through the intermediate portion 201. The pressure portion 200 may include a pressing portion 210 and a fixed portion 220.

The pressing portion 210 is provided on one side of the first metal member B and is connected to the electrode portion 100. The pressing portion 210 is in contact with the first metal member B to apply a pressure to the first metal member B. In other words, the pressing portion 210 receives a current from the electrode portion 100 and transfers the current to the first metal member B to cause the first metal member B to be pressed, and thereby, the first metal member B and the second metal member P may be joined together.

The fixed portion 220 is connected to the electrode portion 100 and is in contact with the second metal member P. That is, the fixed portion 220 receives a current from the electrode portion 100 and transfers the current to the second metal member P.

The intermediate portion 201 is formed to include a plurality of micropores 201h. The intermediate portion 201 is inserted between the first metal member B and the second metal member P and is preferably formed in a shape corresponding to a joint portion where the first metal member B and the second metal member P are in contact with each other. That is, the intermediate portion 201 has a cross section formed to correspond to the joint portion where the first metal member B comes into contact with the second metal member P and may be formed to have a certain thickness. Therefore, the fixed portion 220 is fixed and supports the second metal member P, and when the pressing portion 210 presses the first metal member B, a temperature of the intermediate portion 201 is locally increased, and thereby, the first metal member B and the second metal member P may be joined together. In addition, because the intermediate portion 201 is configured to include the plurality of micropores 201h, the intermediate portion 201 may have high electrical resistance and has a low compressive flow stress to cause intensive plastic deformation to occur in the intermediate portion 201, and thus, the first metal member B and the second metal member P may be joined with a minimum damage.

Figure 3:
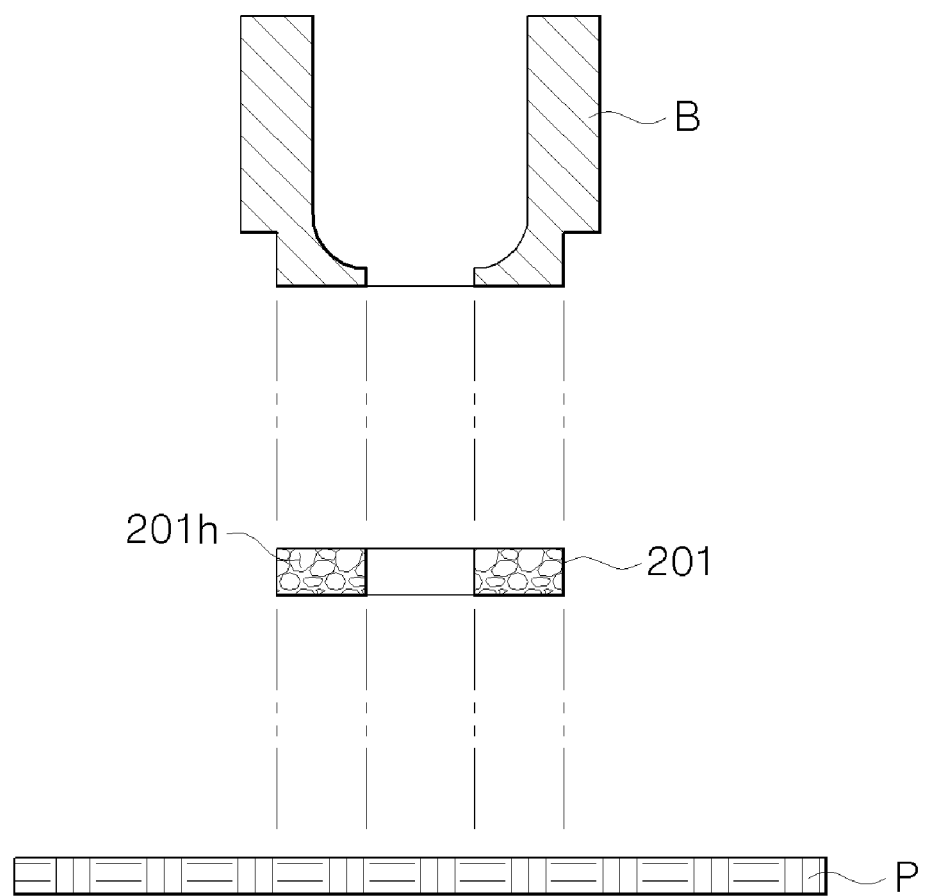
FIGS. 3 to 5 are cross-sectional views showing a manufacturing state of the intermediate portion of the electrically assisted pressure joining apparatus shown in FIG. 1.
Figure 4:
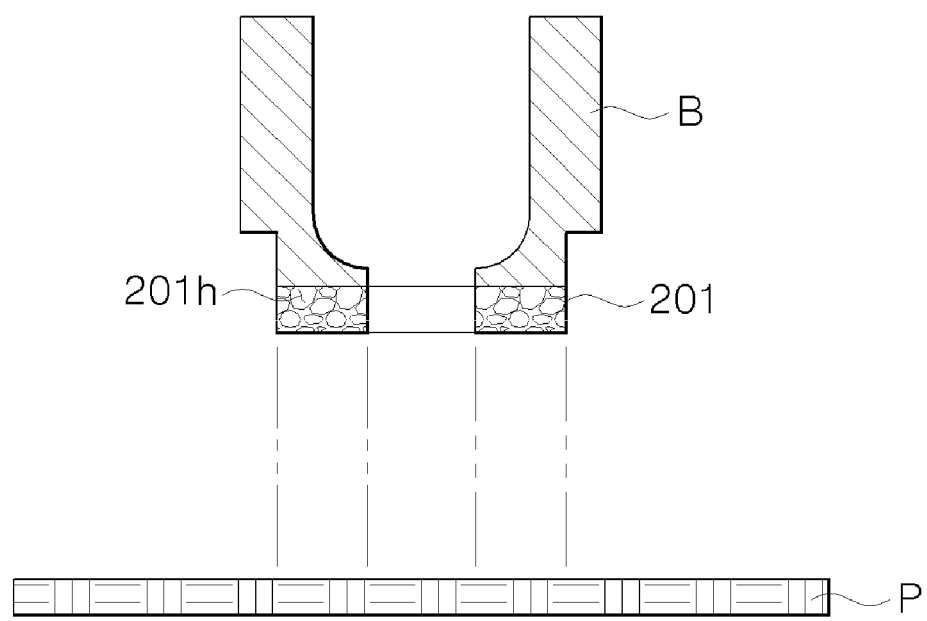
Figure 5:
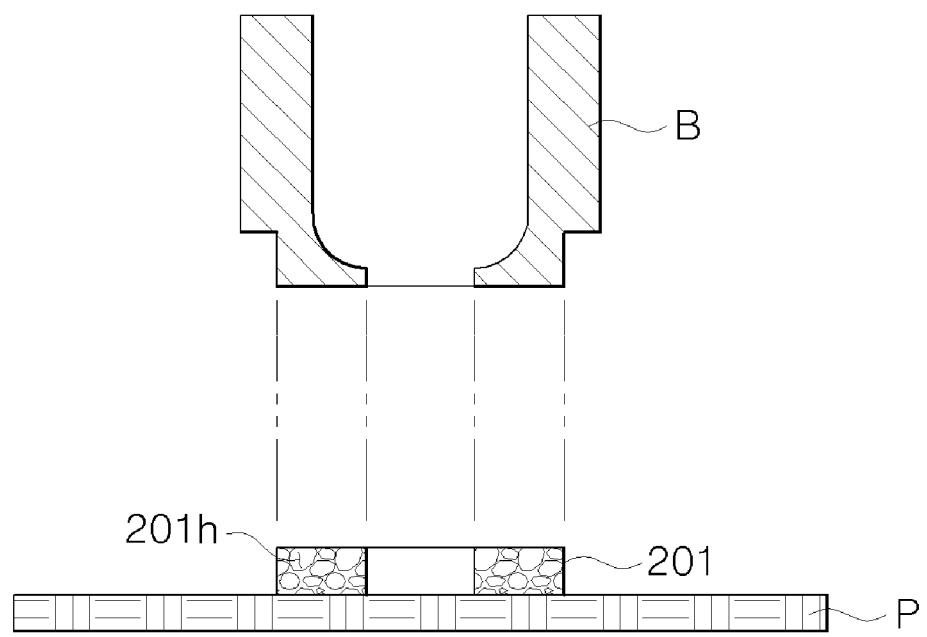

Meanwhile, the intermediate portion 201 may be manufactured through a three-dimensional (3D) printing process. That is, the intermediate portion 201 is preferably manufactured to include the plurality of micropores 201h through a metal 3D printing process. In addition, the intermediate portion 201 may be individually formed in a shape corresponding to a contact portion where the first metal member B and the second metal member P are in contact with each other through the 3D printing process as shown in FIG. 3 and may be manufactured to be printed on one side of the first metal member B or on one side of the second metal member P as shown in FIG. 5. Because the intermediate portion 201 is manufactured on one side of the first metal member B or the second metal member P, when the first metal member B and the second metal member P are joined together, a position of the intermediate portion 201 is easily fixed, thereby increasing manufacturing efficiency. The intermediate portion 201 is not limited to being formed to include the plurality of micropores 201h by using 3D printing and may be manufactured to include the plurality of micropores 201h by using metal powder.

Figure 6:
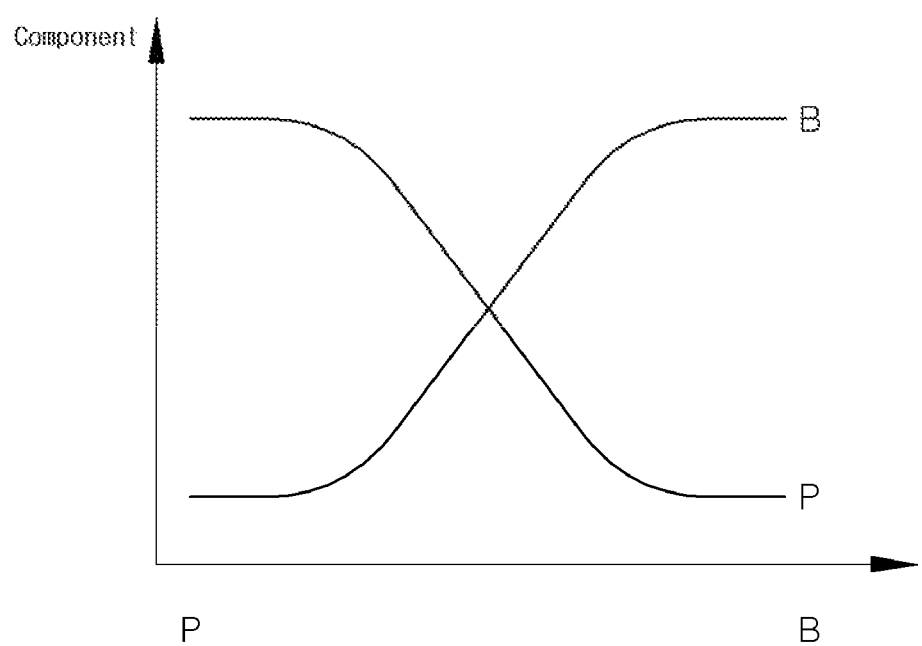
FIG. 6 is a graph showing a distribution of components of the intermediate portion of the electrically assisted pressure joining apparatus shown in FIG. 1.

Meanwhile, the intermediate portion 201 has one side for coming into contact with the first metal material B and the other side for coming into contact with the second metal material P. At this time, as shown in FIG. 6, when the first metal member B or the second metal member P is formed of a heterogeneous material, the intermediate portion 201 is preferably formed such that components of the second metal member P gradually increase from the one side to the other side of and components of the first metal member B gradually increase from the other side to the one side. Therefore, the components of the first metal member B and the second metal member P composed of the heterogeneous materials may be gradually mixed through the intermediate portion 201, and thus, a joining force is increased.

Figure 7:
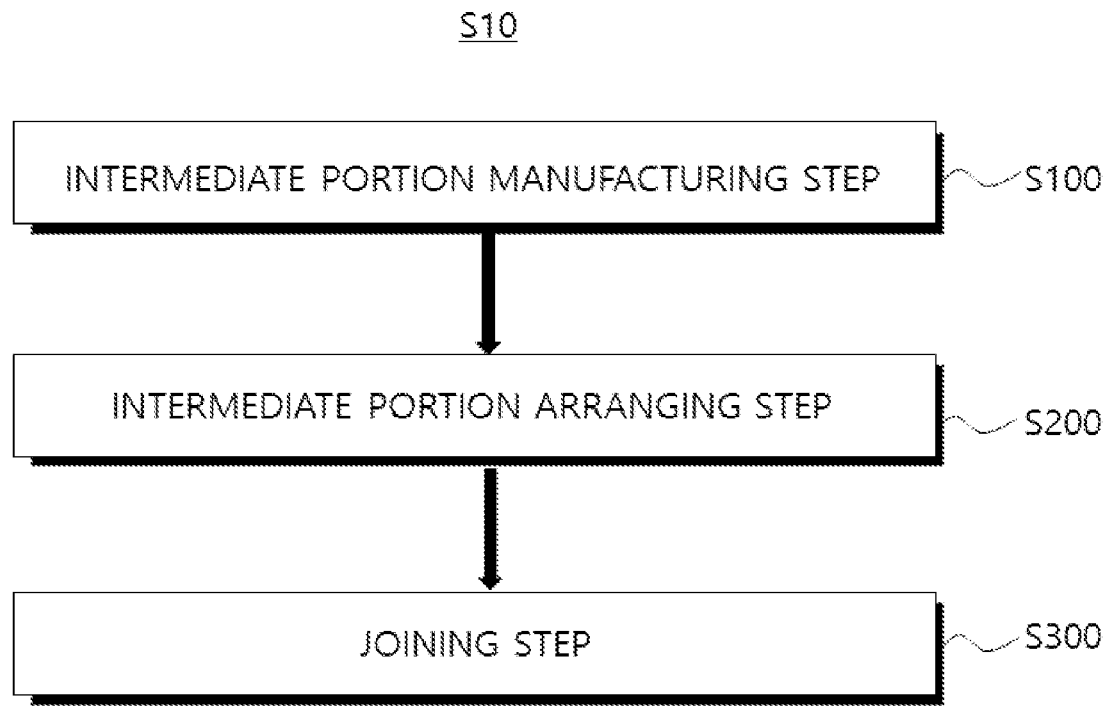
FIG. 7 is a flowchart sequentially showing an electrically assisted pressure joining method of the electrically assisted pressure joining apparatus shown in FIG. 1.

Meanwhile, FIG. 7 is a flowchart showing an electrically assisted pressure joining method S10 of the present invention. the electrically assisted pressure joining method S10 is used to join the first metal member B and the second metal member P by using the electrically assisted pressure joining apparatus 10 including the electrode portion 100 and the pressure portion 200. Here, the same reference numerals of the electrically assisted pressure joining apparatus 10 indicate the same members having the same configuration and function, and thus, repeated description thereof will be omitted. The electrically assisted pressure joining method S10 includes an intermediate portion manufacturing step (S100), an intermediate portion arranging step (S200), and a joining step (S300).

The intermediate portion manufacturing step (S100) is a step for manufacturing the intermediate portion 201 inserted between the first metal member B and the second metal member P. In the intermediate portion manufacturing step (S100), the intermediate portion 201 is manufactured in a shape corresponding to a joint portion between the first metal member B and the second metal member P. In addition, in the intermediate portion manufacturing step (S100), the intermediate portion 201 is manufactured to include a plurality of micropores 201h. At this time, in the intermediate portion manufacturing step (S100), it is preferable to manufacture the intermediate portion 201 through a 3D printing process. That is, in the intermediate portion manufacturing step (S100), the intermediate portion 201 is manufactured to include the plurality of micropores 201h through a metal 3D printing process. In addition, in the intermediate portion manufacturing step (S100), the intermediate portion 201 may be individually manufactured in a shape corresponding to a contact portion where the first metal member B comes into contact with the second metal member P, and may be manufactured to be printed on one side of the first metal member B or on one side of the second metal member P. The intermediate portion 201 is manufactured on one side of the first metal member B or the second metal member P, and thereby, when the first metal member B and the second metal member P are joined together through the intermediate portion 201, a position of the intermediate portion 201 is easily fixed to increase manufacturing efficiency. The intermediate portion manufacturing step (S100) is not limited to manufacturing the intermediate portion 201 through the 3D printing and may be manufactured by using metal powder, and thus, the intermediate portion 201 may include the plurality of micropores 201h.

In the intermediate portion manufacturing step (S100), the intermediate portion 201 is preferably formed such that components of the second metal member P gradually increase from the one side to the other side of and components of the first metal member B gradually increase from the other side to the one side. At this time, the intermediate portion 201 is configured such that the one side is in contact with the first metal material B and the other side is in contact with the second metal material P. Therefore, in the intermediate portion manufacturing step (S100), when the first metal member B or the second metal member P is formed of a heterogeneous material, the intermediate portion 201 may be formed such that components of the second metal member P gradually increase from the one side to the other side of and components of the first metal member B gradually increase from the other side to the one side. Therefore, the components of the first metal member B and the second metal member P composed of the heterogeneous materials may be gradually mixed through the intermediate portion 201, and thus, a joining force is increased.

In the intermediate portion arranging step (S200), the intermediate portion 201 manufactured during the intermediate portion manufacturing step (S100) is located between the first metal member B and the second metal member P. That is, in the intermediate portion arranging step (S200), one side of the intermediate portion 201 is arranged to be in contact with the first metal member (B), and the other side thereof is arranged to be in contact with the second metal member P.

The joining step (S300) is a step for joining the first metal member B and the second metal member P together. In the joining step (S300), the pressing portion 210 receives a current from the electrode portion 100 and applies a pressure to the first metal member B, and thereby, the first metal member B and the second metal member P are joined through the intermediate portion 201. That is, in the joining step (S300), in a state in which the intermediate portion 201 is inserted between the first metal member B and the second metal member P from the intermediate portion arranging step (S200), a current is applied to the first metal member B and the second metal member P, thereby pressing the first metal member (B) to cause intensive plastic deformation to occur in the intermediate portion 201, and thus, the first metal member B and the second metal member P may be joined together.

According to the electrically assisted pressure joining apparatus 10 and the electrically assisted pressure joining method (S10) of the present invention, the intermediate portion 201 may be formed to include the plurality of micropores 201h, and the first metal member B and the second metal member P may be minimized in damage due to a low compressive flow stress, and a high electrical resistance of the intermediate portion 201 may generate a local high temperature portion, and thus, the first metal member B and the second metal member P are easily joined together.

In addition, by manufacturing the intermediate portion 201 through 3D printing, the intermediate portion 201 may be easily manufactured and may be printed directly on the first metal member B or the second metal member P, and thus, a position of the intermediate portion 201 may be easily fixed, and thus, manufacturing efficiency thereof is increased.

In addition, components on one side and the other side of the intermediate portion 201 may be formed to gradually increase components of the first metal member B and the second metal member P, respectively, and thereby, components of a joint portion between the first metal member B and the second metal member P may be gradually mixed to increase a joining force.

The present invention is described with reference to the embodiments shown in the drawings, but the embodiments are merely examples, and those skilled in the art will appreciate that various modifications and equivalent other embodiments are possible therefrom. Therefore, the true technical protection scope of the present invention should be determined by the technical idea of the appended claims.

SIGNS LIST

10: electrically assisted pressure joining apparatus
100: electrode portion
200: pressure portion
201: intermediate portion
201h: micropore
210: pressing portion
220: fixed portion
B: first metal member
P: second metal member

The invention claimed is:

1. An electrically assisted pressure joining apparatus for joining a first metal member and a second metal member together, comprising:
    an electrode portion;
    an intermediate portion including a plurality of micropores and inserted between the first metal member and the second metal member, wherein the plurality of micropores is included throughout an entire of the intermediate portion; and
    a pressure portion connected to the electrode portion to receive a current from the electrode portion and transfer the current to the first metal member and the second metal member to apply a pressure to the first metal member such that the first metal member and the second metal member are joined together by the intermediate portion,
    wherein the intermediate portion is formed in a shape corresponding to a joint portion where the first metal member and the second metal member are in contact with each other, the intermediate portion
        having a first surface in direct contact with the first metal member and a second surface in direct contact with the second metal member, and
        being formed such that
            components of the first metal member gradually increases from the second surface to the first surface of the intermediate portion, and
            components of the second metal member gradually increases from the first surface to second surface of the intermediate portion.

2. The electrically assisted pressure joining apparatus of claim 1,
    wherein the pressure portion includes a pressing portion connected to the electrode portion and arranged to be in contact with the first metal member to apply a pressure to the first metal member, and a fixed portion connected to the electrode portion and arranged to be in contact with the second metal member.

3. The electrically assisted pressure joining apparatus of claim 1,
    wherein the intermediate portion is manufactured through a three-dimensional printing process.

4. The electrically assisted pressure joining apparatus of claim 1,
    wherein the intermediate portion is printed on the first metal member or the second metal member.

5. The electrically assisted pressure joining apparatus of claim 1,
    wherein the intermediate portion is manufactured by using metal powder.

6. An electrically assisted pressure joining method for joining a first metal member and a second metal member together by using an electrically assisted pressure joining apparatus includes an electrode portion and a pressing portion connected to the electrode portion and arranged to be in contact with the first metal member to apply a pressure to the first metal member and a fixed portion connected to the electrode portion and arranged to in contact with the second metal member, the method comprising:
    an intermediate portion manufacturing step of manufacturing an intermediate portion formed to include a plurality of micropores in a shape corresponding to a joint portion between the first metal member and the second metal member, wherein the plurality of micropores is included throughout an entire of the intermediate portion;
    an intermediate portion arranging step of arranging the intermediate portion between the first metal member and the second metal member; and
    a joining step of joining the first metal member and the second metal member together through the intermediate portion by receiving a current from the electrode portion and applying a pressure to the first metal member through the pressing portion,
    the intermediate portion
        has a first surface in direct contact with the first metal member and a second surface in direct contact with the second metal member, and
        is formed such that
            components of the first metal member gradually increases from the second surface to the first surface of the intermediate portion, and
            components of the second metal member gradually increases from the first surface to second surface of the intermediate portion.

7. The electrically assisted pressure joining method of claim 6,
    wherein, in the intermediate portion manufacturing step, the intermediate portion is manufactured through a three-dimensional printing process.

8. The electrically assisted pressure joining method of claim 7,
    wherein, in the intermediate portion manufacturing step, the intermediate portion is printed on the first metal member or the second metal member.

9. The electrically assisted pressure joining method of claim 6, wherein, in the intermediate portion manufacturing step, the intermediate portion is manufactured by using metal powder.

\* \* \* \* \*